United States Patent
Eick et al.

(10) Patent No.: US 7,252,068 B2
(45) Date of Patent: Aug. 7, 2007

(54) SYSTEM AND METHOD TO REDUCE FUEL SYSTEM PUMPING HEAT INPUT

(75) Inventors: Chris D. Eick, Phoenix, AZ (US); Paul W. Futa, Jr., North Liberty, IN (US)

(73) Assignee: Honeywell International, Inc., Morristown, NJ (US)

( * ) Notice: Subject to any disclaimer, the term of this patent is extended or adjusted under 35 U.S.C. 154(b) by 106 days.

(21) Appl. No.: 11/042,450

(22) Filed: Jan. 24, 2005

(65) Prior Publication Data

US 2006/0021324 A1   Feb. 2, 2006

Related U.S. Application Data

(60) Provisional application No. 60/598,501, filed on Aug. 2, 2004.

(51) Int. Cl.
*F02M 63/02* (2006.01)
*F02C 9/00* (2006.01)

(52) U.S. Cl. ............... 123/198 DB; 60/39.281
(58) Field of Classification Search ......... 123/198 DB, 123/198 DC; 60/39.281
See application file for complete search history.

(56) References Cited

U.S. PATENT DOCUMENTS

| | | | |
|---|---|---|---|
| 2,980,173 A | 4/1961 | Perkey | |
| 3,067,576 A | 12/1962 | Campbell et al. | |
| 3,367,107 A | 2/1968 | Richardson et al. | |
| 3,777,480 A | 12/1973 | Stoltman | |
| 3,964,253 A | 6/1976 | Paduch et al. | |
| 4,062,186 A | 12/1977 | Snow et al. | |
| 4,380,976 A * | 4/1983 | Bottiglieri | 123/198 DB |
| 4,555,977 A | 12/1985 | Motzer | |
| 4,817,375 A | 4/1989 | Brocard et al. | |
| 5,715,674 A | 2/1998 | Reuter et al. | |
| 6,655,123 B2 | 12/2003 | Blot-Carretero et al. | |

* cited by examiner

*Primary Examiner*—Stephen K. Cronin
*Assistant Examiner*—Hyder Ali
(74) *Attorney, Agent, or Firm*—Ingrassia Fisher & Lorenz

(57) ABSTRACT

The present invention discloses a relatively simple system and method to reduce fuel system pumping by automatically turning on and off servo flow to various non-needed devices or "start lockout" servos during engine start. The invention takes advantage of a fuel pressure rise provided by the fuel pump during the period from engine start until the pump speed is greater than windmill. This pressure rise is used to move a pressure activated piston in a servo shutoff valve from a normally closed position to an open position, which at higher pressures allow servo flow to the "start lockout" servos through the servo lockout valve. When the pressure is reduce, the piston return to a normally closed position due to a biasing spring closing the servo lockout valve. This opening and closing of the servo lockout valve occurs automatically with no other external input.

29 Claims, 2 Drawing Sheets

SYSTEM AND METHOD TO REDUCE FUEL SYSTEM PUMPING HEAT INPUT

CROSS-REFERENCE TO RELATED APPLICATION

This application claims the benefit of U.S. Provisional Application No. 60/598,501, filed Aug. 2, 2004.

TECHNICAL FIELD

The present invention relates to a servo lockout valve for use in a servo lockout system and, more particularly, to a servo lockout valve that shuts off unregulated servo pressure during engine start.

BACKGROUND

A fuel system in an aircraft is designed to supply high pressure fuel to the engines which power the aircraft. In addition, the high pressure fuel system is often utilized as a source of high pressure fluid for the hydraulic systems and servos which position actuators which control the engine or other aspects of the aircraft. Fuel systems must be sized to supply enough fuel to the engine to start it reliably. Most fuel pumps are sized at windmill start conditions, which are typically about 5–6% of normal speed. Gear pumps typically have low efficiency at these low speeds so the resulting pump size may be large to meet engine flow demands, which may include burn flow and servo flow to various actuators and air handling valves. The flow for the actuators and air handling valves may exceed that required by the engine. Hence, the resulting pump size from this sizing requirement can be quite large and can generate significant heat during normal engine operation. This heat, in conjunction with engine oil heat dissipation into the fuel system, may result in high fuel system temperatures, which in turn may result in low Hydro Mechanical Unit (HMU) seal life and lower Electro Mechanical Interface Device (EMID) life.

Some of the servo flow during an engine start or windmill start may be diverted to devices that may not need to be active during that portion of the engine start cycle. For example, the high pressure turbine active clearance control (HPTACC) and low pressure turbine active clearance control (LPTACC) valves may not be required during that portion, or other portions, of the engine start. Prior art systems have used electric solenoid valves to turn flow on and off to the non-required servos. However, this can be relatively expensive, heavy, and can consume significant electrical power Accordingly, it would be desirable to lock out, or at least limit, flow to various devices that may not be needed during start (or portions thereof) with a pressure activated servo lockout valve to eliminate the weight and expense of a electric solenoid valve, which would allow a smaller main fuel pump size, and subsequently, less fuel-pump-generated heat during normal engine operation. Furthermore, other desirable features and characteristics of the present invention will become apparent from the subsequent detailed description and the appended claims, taken in conjunction with the accompanying drawings and the foregoing technical field and background.

BRIEF SUMMARY

The present invention provides a relatively simple way to automatically turn on and off servo flow to various non-needed devices or "start lockout" servos during engine start. The present invention takes advantage of a fuel pressure rise provided by the fuel pump during the period from engine start until the pump speed is greater than windmill. This pressure rise is used to move a pressure activated piston in a servo shutoff valve from a normally closed position to an open position, which at higher pressures allows servo flow to the "start lockout" servos through the servo lockout valve. When the pressure is reduced, the piston returns to the normally closed position due to a biasing spring closing the servo lockout valve. This opening and closing of the servo lockout valve occurs automatically with no other external input. Significant cost, weight, and power savings may be seen as a result.

In one embodiment, and by way of example only, a servo lockout valve for use in a servo lockout system is coupled to a fuel pump. The servo lockout valve includes a pressure activated piston that responds to fuel pressure from the fuel pump to move the piston between a first position and a second position based on the fuel pressure. The servo lockout valve further includes a fluid inlet and a fluid outlet. In the first position, the fluid inlet and the fluid outlet are not in fluid communication. In the second position, the fluid inlet and the fluid outlet are in fluid communication.

In another embodiment, and by way of example only, a servo lockout system includes a servo pressure regulator and one or more "start lockout" servos. The servo lockout valve includes a body having a first fluid inlet coupled to the servo pressure regulator, a first fluid outlet coupled to the one or more "start lockout" servos and a second fluid inlet coupled to the fuel pump. The servo lockout valve further includes a pressure activated piston within the body that responds to fuel pressure entering the second fluid inlet to move the piston between a first position and a second position based on the fuel pressure. In the first position, the first fluid inlet and the first fluid outlet are not in fluid communication. In the second position, the first fluid inlet and the first fluid outlet are in fluid communication.

In another embodiment, and by way of example only, a method is disclosed to automatically turn fuel flow on and off in a servo lockout valve. The servo lockout valve includes a pressure activate piston, a fluid inlet and a fluid outlet. The method includes receiving fuel pressure by the pressure activated piston, and moving the pressure activated piston between a first position and a second position based on the fuel pressure from the fuel pump. In the first position there is no fluid flow in the servo lockout valve between the first fluid inlet and the first fluid outlet. In the second position there is fluid flow between the first fluid inlet and the first fluid outlet allowing fuel flow through the servo lockout valve.

Other independent features and advantages will become apparent from the following detailed description, taken in conjunction with the accompanying drawings which illustrate, by way of example, the principles of the invention.

BRIEF DESCRIPTION OF THE DRAWINGS

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
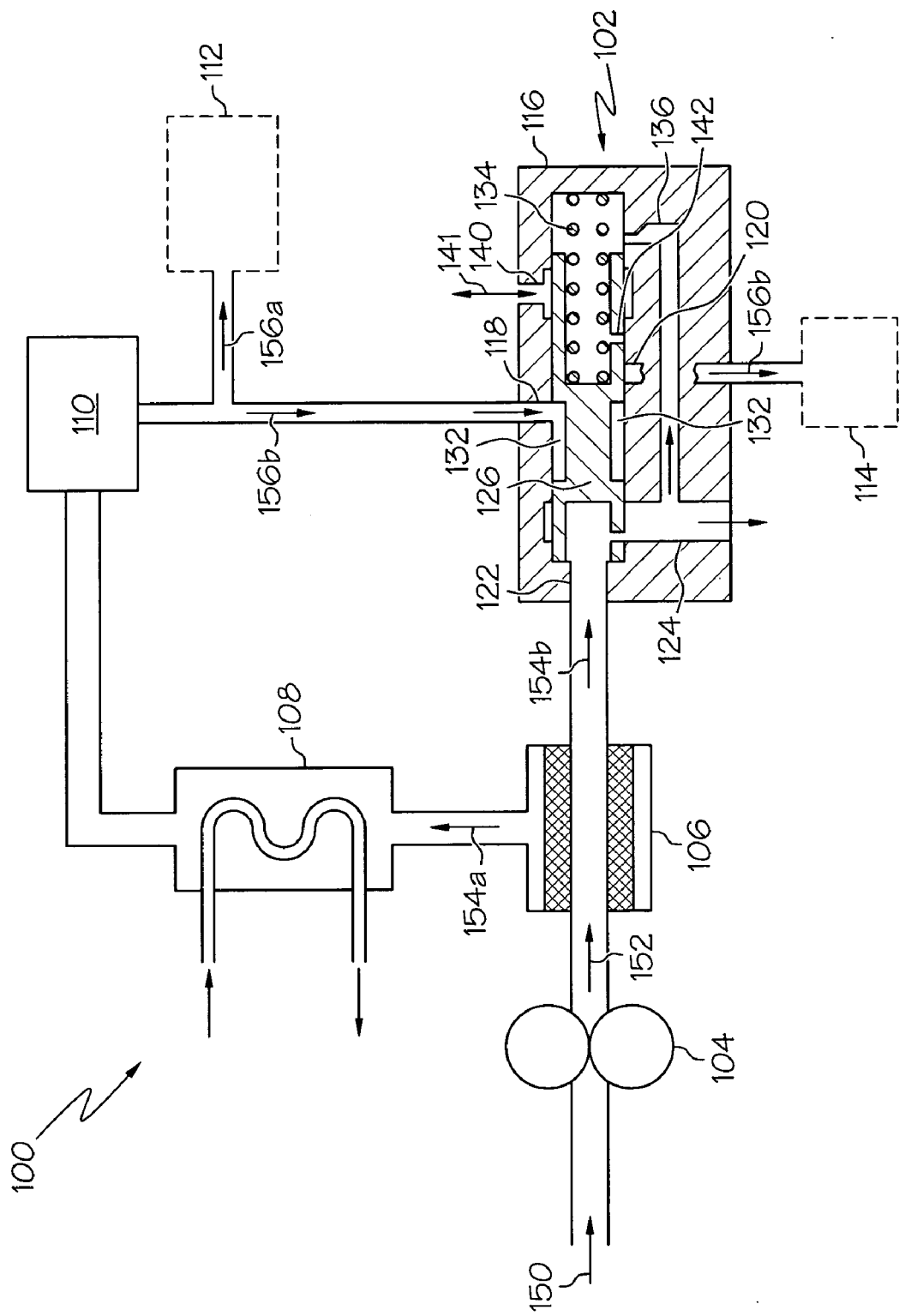
FIG. 1 is a schematic diagram showing a servo lockout system including a servo lockout valve.

FIG. 1 shows a simplified schematic diagram of a servo lockout system 100 including a cross-sectional view of a servo lockout valve 102. The system 100 may also include a fuel pump 104, a wash filter 106, a servo heat exchanger 108, a servo pressure regulator 110, one or more "always active" servos 112 and one or more "start lockout" servos 114. The servo lockout valve 102 is designed to shut off unregulated servo pressure to the "start lockout" servos 114 during, for example, engine shutoff and windmill operation.

Figure 2:
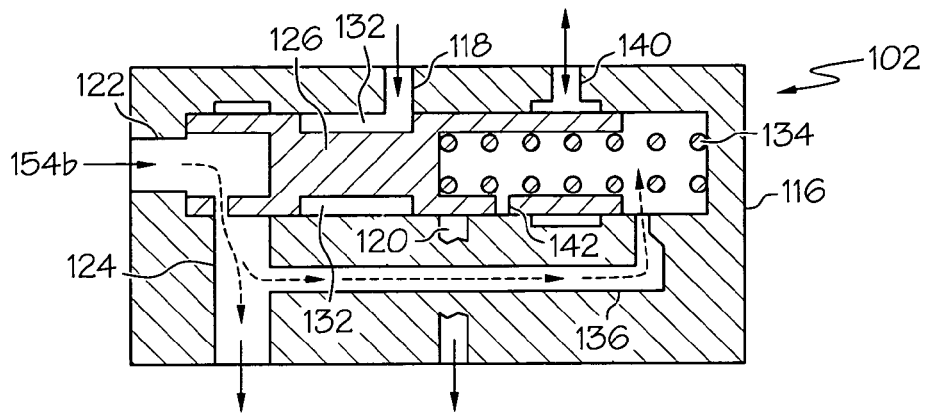
FIG. 2 is a cross-sectional view of the servo lockout valve of FIG. 1 showing the servo lockout valve in a fully closed position stopping flow to the "start lockout" servos.

FIGS. 1 and 2 show a simplified cross-sectional view of a servo lockout valve 102 in the closed position stopping flow to the "start lockout" servos 114. The servo lockout valve 102 includes a body 116 having a first fluid inlet 118 from the servo pressure regulator 110, a first fluid outlet 120 to the "start lockout" servos 114, a second fluid inlet 122 from the fluid pump 104, and a second fluid outlet 124. The servo lockout valve 102 also includes a pressure activated piston 126 having an annular passage 132. A biasing spring 134 may also be included to hold the piston 126 in a normally closed position (or first position). In the closed position, the annular passage 132 in the piston 126 is not aligned with the first fluid outlet 120, and the piston 126 blocks fluids from flowing from the first fluid inlet 118 into the first fluid outlet 120. The piston 126 is movable from the closed position to an open position (or second position), which aligns the annular passage 132 in the piston 126 with the first fluid inlet 118 and the first fluid outlet 120, and allows fluids to flow from the first fluid inlet 118 into the first fluid outlet 120. The piston 126 also includes an orifice 130 between the second fluid inlet 122 and the second outlet 124. At the low pump flows seen during windmill starting, the orifice 130 can handle the flow between the second fluid inlet 122 and the second outlet 124. At the higher flows after engine start, the orifice is not able to handle the flow and the flow pressure is exerted on the piston 126 face (or first side) moving the piston 126 from the closed position toward the open position. The servo lockout valve 102 also includes a fluid passage 136 that connects the second fluid outlet 124 to the spring 134 side of the piston 126. The fluid passage 136 equalizes the pressure on both sides of the piston 126 when it is in the closed position. A reset fluid inlet 140 is connected to fuel control return pressure or lockout valve reset pressure. The piston 126 includes a hole 142 that aligns with an annular passage connected to the reset fluid inlet 140 once the piston 126 starts to move toward the open position. The reset fluid inlet 140 may be used to apply fluid pressure to the spring side (or second side) of the piston 126 to force it closed.

The servo lockout valve 102 is designed to operate on total fuel metering unit (FMU) flow as a representation of engine speed. At windmill (e.g., low total flow), the servo lockout valve 102 is spring-loaded closed by spring 134, and the first fluid outlet 120, which is in fluid communication with the "start lockout" servos 114, is blocked off from the first fluid inlet 118 by the piston 126. The orifice 130 connects the second fluid inlet 122 and the second fluid outlet 124 and the pressure drop across this orifice 130 is the working pressure differential acting on the servo lockout valve 102, opposing the spring 134 force. As total flow increases beyond the windmill case, so does the pressure differential, and the piston 126 in the servo lockout valve 102 begins to move or crack open (see FIG. 3). At a sufficiently high sub-idle total flow, the piston 126 moves to block off the fluid passage 136 to the spring side of the piston 126, which drives the servo lockout valve 102 further open. The hole 142 in the piston 126 is aligned with the reset fluid inlet 140, which may be used to flow fluid to the spring side of the piston 126. As the piston 126 moves to the fully open position (see FIG. 4), the first fluid inlet 118 is in fluid communication with the first outlet 120 via the annular passage 132 in the piston 126. The servo lockout valve 102 remains open with sufficient pressure to push the piston 126 hard against the stop and out of the way, minimizing the pressure drop, throughout normal operation.

The servo lockout valve 102 may be reset to the closed or windmill position by the spring 134 load overcoming the opening pressure 154b (see FIG. 1) at total system shutdown or sub-idle flow. The servo lockout valve 102 may also be reset by sending fluid pressure 141 to the reset fluid inlet 140 on the spring 134 side of the piston 126 to help it close (move the piston toward the closed position). One example is a Full-Authority Digital Electronic Control-commandable reset function, for example, the electro hydraulic servo valve (EHSV)—via second stage overtravel, that ports fluid pressure 141 to the reset fluid inlet 140 to help the piston 126 close.

Figure 3:
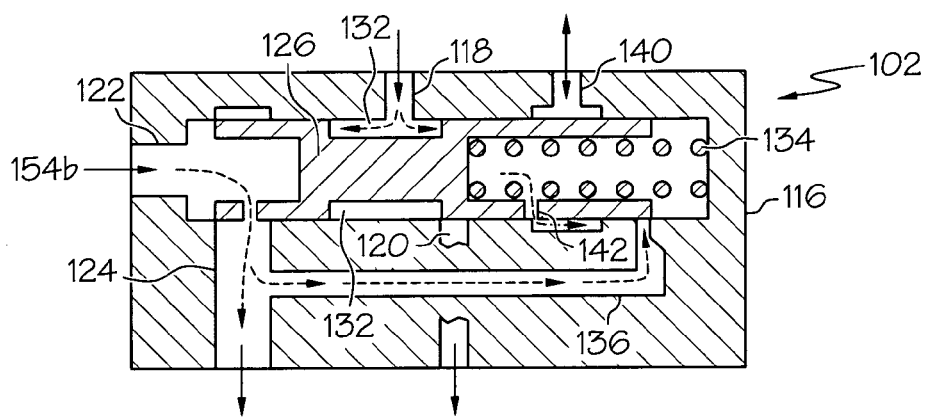
FIG. 3 is a cross-sectional view of the servo lockout valve of FIG. 1 showing the servo lockout valve in a cracked position with the piston starting to move.
Figure 4:
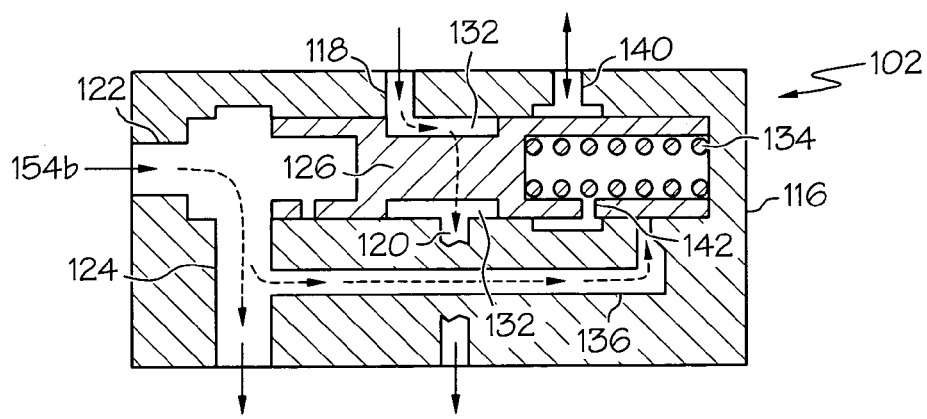
FIG. 4 is a cross-sectional view of the servo lockout valve of FIG. 1 showing the servo lockout valve in a fully open position allowing flow to the "start lockout" servos.

FIGS. 2–4 are simplified cross-sectional views of the servo lockout valve 102 showing the servo lockout valve 102 opening. The servo lockout valve 102 prevents servo flow to various devices 114 until pump speed is greater than windmill (e.g., about 15%). Referring now to FIG. 2, initially fluid flow 154b from the fuel pump 104 is at low pressure and flows from the second fluid inlet 122 to the second fluid outlet 124 through the orifice 130. This same low pressure also flows through the fluid passage 136 to the spring side of the piston, equalizing the pressure on both sides of the piston 126, such that the spring 134 holds the piston 126 in the closed position preventing flow to the "start lockout" servos 114. Referring now to FIG. 3 showing the servo lockout valve in a cracked position, as the fluid pressure increases in the second fluid inlet 122, the orifice 130 is not able to handle all the fluid flow, creating a higher pressure on the inlet side of the orifice 130. This higher pressure moves the piston 126 against the spring 134 and compresses the spring 134. This piston 126 movement closes the fluid passage 136 to the spring side of the piston 126 creating a pressure imbalance, opening the piston 126 further. Referring now to FIG. 4 showing the servo lockout valve in a fully open position, when enough pressure is reached, the piston 126 moves so that the annular passage 132 is aligned with both the first fluid inlet 118 and the first fluid outlet 120, allowing fluid to flow between them and to the "start lockout" servos 114.

In use, the fuel pump 104 receives fuel 150 from a fuel supply (not shown) and pressurizes it to produce pressurized fuel 152. The pressurized fuel 152 enters the wash filter where it is split, a first portion 154a going to the servo heat exchanger 108 and a second portion 154b continuing to the second fluid inlet 122 of the servo lockout valve 102. The first portion 154a continues from the servo heat exchanger 108 to the servo pressure regulator 110. After the servo pressure regulator 110, the fluid 154a flow is again split, with some flow 156a going to the "always active" servos 112, and the remainder of the flow 156b going to the first fluid inlet 118 of the servo lockout valve 102. The piston 126 of the servo lockout valve 102 blocks servo flow 156b to the first fluid outlet 120 to various devices, such as "start lockout" servos 114, until pump speed is greater than windmill (e.g., about 15%). Once the pump speed is greater than windmill, the pressure from the second portion 154b continuing to the servo lockout valve 102 increases, moving the pressure activated piston 126 and opening the servo lockout valve 102 allowing flow between the first fluid inlet 118 and the first fluid outlet 120 via the annular passage 132. The servo flow 156b is then able to flow through the servo lockout valve 102 to the various devices, such as "start lockout" servos 114. This type of design means that the pump can be sized smaller at windmill and will generate less heat during engine operation.

Preferably, the servo lockout valve 102 is incorporated into the FMU to limit the system flow demand at low (e.g., windmill) speed. The servo lockout valve 102 operates based on FMU total flow, and blocks off washed servo supply 156b to the "start lockout" servos 114, such as variable bleed valve (VBV) actuator and LPTACC, HPTACC, and transient bleed valve (TBV) air valves. This reduction in flow demand enables a significant reduction pump size and weight, allowing pump swept volume displacement to be sized for takeoff rather than windmill. When opened, the servo lockout valve 102 moves "out of the way" to limit pressure drop at high flow. Preferably, the FMU includes a unique feature to "reset" the servo lockout valve 102 to the windmill position (or closed position) via an overtravel land in the EHSV.

Analysis shows that the servo lockout valve 102 reduces cost, weight, cruise fuel temperature, and cruise pumping power. This occurs because pump size is reduced when servo flow to non-essential devices are locked out during windmill. This reduction in pump size creates a corresponding reduction in pump cost and weight. Further, the smaller pump size imparts less heat into the fuel at cruise and uses less power.

The servo lockout valve adds minimal cost and complexity to the system as the hydraulic functionality is added to lockout the servos to the nozzle control electro hydraulic servo valve. No additional fuel tubes are required to activate the servo lockout. Further, no additional EMID's in the FMU or FADEC drivers are required to actuate the servo lockout.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A servo lockout valve for use in a servo lockout system coupled to a fuel pump, comprising:
    a body having a first fluid inlet, a first fluid outlet, a second fluid inlet, and a second fluid outlet, the first fluid inlet and the first fluid outlet configured to communicate with the servo lockout system, and the second fluid inlet and second fluid outlet configured to communicate with the fuel pump; and
    a pressure activated piston slideably positioned within the body, the piston including an outer surface, an annular passage, and an orifice, the annular passage and the orifice formed on the piston outer surface, wherein the piston is configured to respond to fuel pressure entering the second fluid inlet to move the piston between a first position and a second position based on the fuel pressure, wherein in the first position the first fluid inlet and the first fluid outlet are not in fluid communication and the second fluid inlet, the orifice, and the second fluid outlet are in fluid communication, and in the second position the first fluid inlet, the annular passage, and the first fluid outlet are in fluid communication and the second fluid inlet and the second fluid outlet are in fluid communication.

2. The servo lockout valve of claim 1, wherein the fuel pressure from the fuel pump is based on engine speed.

3. The servo lockout valve of claim 1, wherein the servo lookout system further includes a servo pressure regulator and the first fluid inlet is configured to be coupled to the servo pressure regulator.

4. The servo lockout valve of claim 1, wherein the servo lockout system further includes one or more "start lockout" servos and the first fluid outlet is configured to be coupled to the one or more "start lockout" servos.

5. The servo lockout valve of claim 1, further comprising a biasing spring coupled to the piston, the biasing spring being configured to urge the piston toward the first position.

6. The servo lockout valve of claim 5, wherein the biasing spring provides a pre-load on the piston, and the fuel pressure on the piston must overcome the spring pre-load for the piston to move from the first position.

7. The servo lockout valve of claim 1, wherein the piston has a first side and a second side, and further comprising a pressure equalization passage configured to equalize the pressure on the first side and the second side.

8. The servo lockout valve of claim 7, wherein the pressure equalization passage is open in the first position and closed in the second position.

9. The servo lockout valve of claim 7, further comprising a reset fluid inlet in fluid communication with the second side of the piston when the piston is in the second position.

10. A servo lockout system, comprising
    a servo pressure regulator;
    one or more "start lockout" servos; and
    a servo lockout valve coupled to a fuel pump, the servo lockout valve including:
        a body having a first fluid inlet coupled the servo pressure regulator, a first fluid outlet coupled to the one or more "start lockout" servos, a second fluid inlet coupled to the fuel pump, and a second fluid outlet; and
        a pressure activated piston slideably positioned within the body, the piston including an outer surface, an annular passage, and an orifice, the annular passage and the orifice formed on the piston outer surface, wherein the piston is configured to respond to fuel pressure entering the second fluid inlet to move the piston between a first position and a second position based on the fuel pressure, wherein in the first position the first fluid inlet and the first fluid outlet are not in fluid communication, and in the second position the first fluid inlet, the annular passage, and the first fluid outlet are in fluid communication and the second fluid inlet and the second fluid outlet are in fluid communication.

11. The servo lockout system of claim 10, wherein the fuel pressure from the fuel pump is based on engine speed.

12. The servo lockout system of claim 10, further comprising a biasing spring within the housing coupled to the piston, the biasing spring being configured to urge the piston toward the first position.

13. The servo lockout system of claim 12, wherein the biasing spring provides a pre-load on the piston, and the fuel pressure on the piston must overcome the spring pre-load for the piston to move from the first position.

14. The servo lockout system of claim 12, wherein the piston has a first side and a second side, and further comprising a pressure equalization passage configured to equalize the pressure on the first side and the second side.

15. The servo lockout system of claim 14, wherein the pressure equalization passage is open in the first position and closed in the second position.

16. The servo lockout system of claim 14, further comprising a reset fluid inlet in fluid communication with the second side of the piston when the piston is in the second position.

17. A method to automatically turn fuel flow on and off in a servo lockout valve for use in a servo system and coupled to a fuel pump, the servo lockout valve having a pressure activate piston, a first fluid inlet, a first fluid outlet, a second fluid inlet, and a second fluid outlet, the first inlet and the first fluid outlet in communication with the servo system, and the second fluid inlet and the second fluid outlet in communication with the fuel pump, the method comprising the steps of:
  receiving fuel pressure by the pressure activated piston; and
  moving the pressure activated piston between a first position and a second position based on the fuel pressure, wherein in the first position there is no fluid flow between the first fluid inlet and the first fluid outlet and the second fluid inlet and the second fluid outlet are in fluid communication, and in the second position there is fluid flow between the first fluid inlet and the first fluid outlet allowing fuel flow through the servo lockout valve and the second fluid inlet and the second fluid outlet are in fluid communication.

18. The method of claim 17, wherein the fuel pressure is based on engine speed.

19. The method of claim 17, wherein the piston includes an annular passage configured to align with both the first fluid inlet and first fluid outlet in the second position.

20. The method of claim 17, further comprising pushing the piston with a biasing spring toward the first position.

21. The method of claim 20, wherein the biasing spring provides a pre-load on the piston and the fuel pressure on the piston must overcome the spring pre-load for the piston to move from the first position.

22. The method of claim 17, further comprising equalizing the pressure between a first side and a second side of the piston with a pressure equalization passage in the servo lockout valve.

23. The method of claim 22, wherein the pressure equalization passage is open in the first position and closed in the second position.

24. The method of claim 22, further comprising resetting the piston to the first position by applying pressure through a reset fluid inlet to the second side of the piston when the piston is in the second position.

25. The method of claim 17, wherein the fuel pressure is from a fuel pump.

26. The method of claim 25, wherein the pressure activate piston coupled to the fuel pump.

27. The method of claim 17, wherein the fluid inlet is coupled to a servo pressure regulator.

28. The method of claim 27, wherein the fluid outlet is coupled to the one or more "start lockout" servos.

29. The method of claim 28, wherein allowing fuel flow through the servo lockout valve in the second position allows fuel to flow from the servo pressure regulator to the one or more "start lockout" servos.

* * * * *